UNITED STATES PATENT OFFICE.

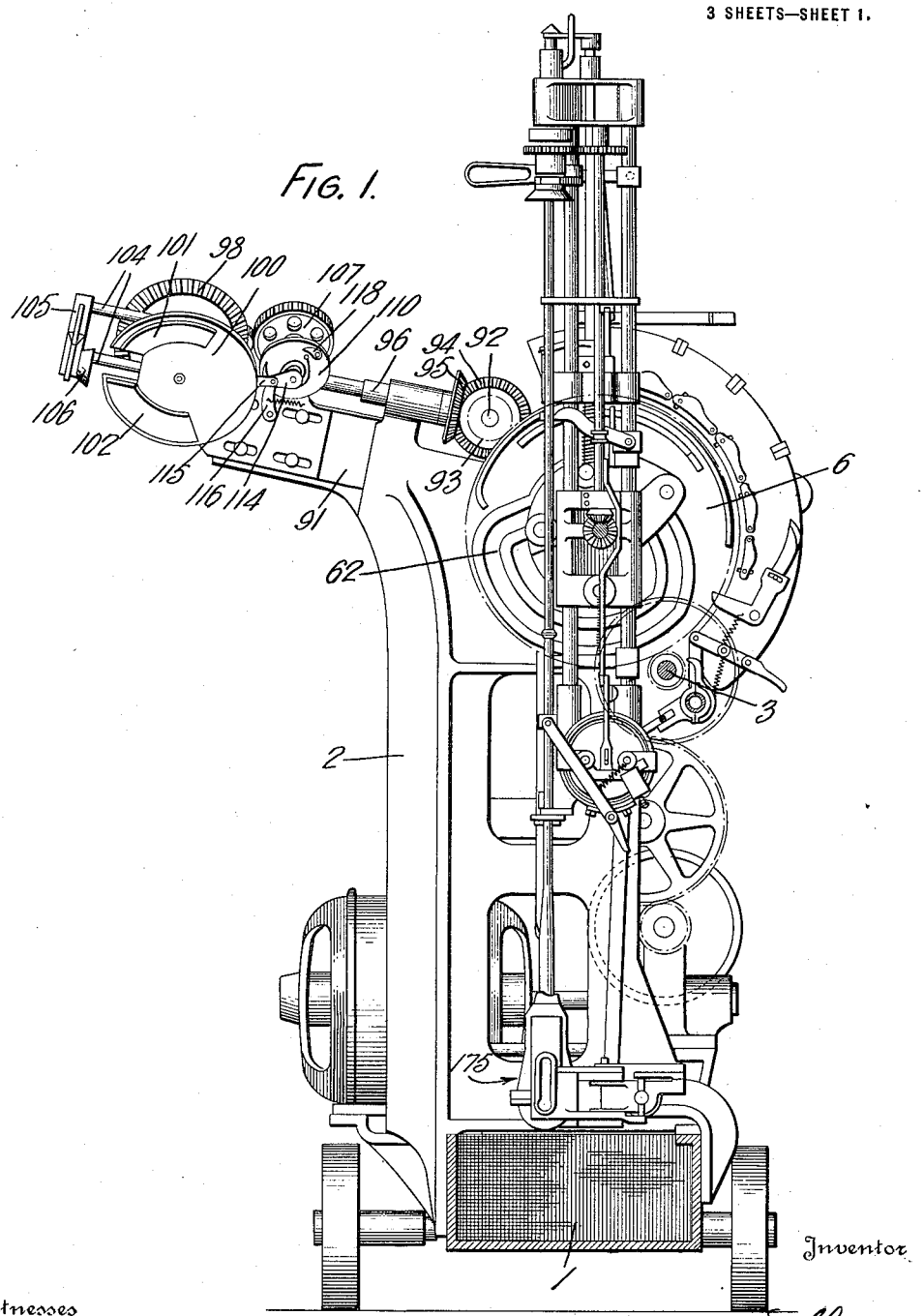

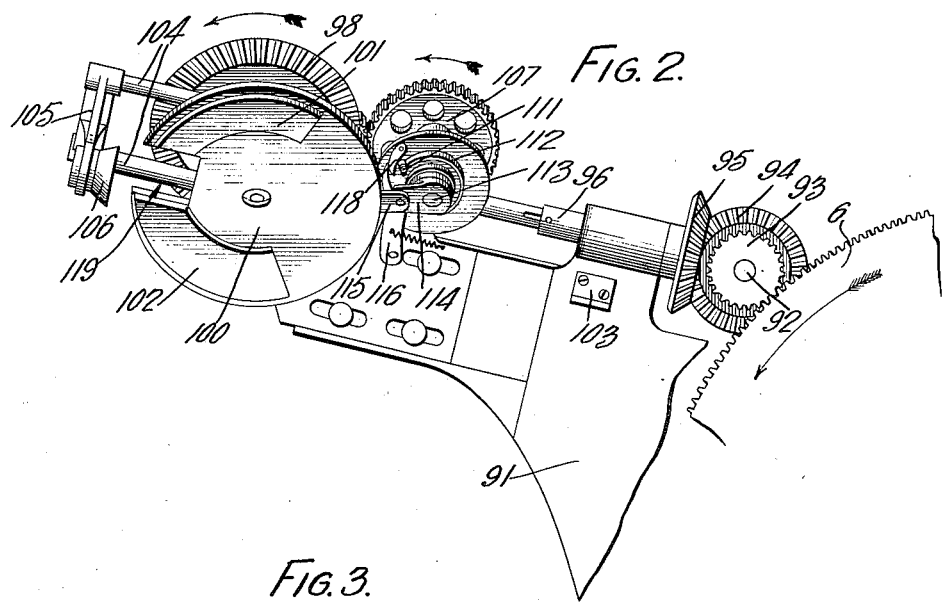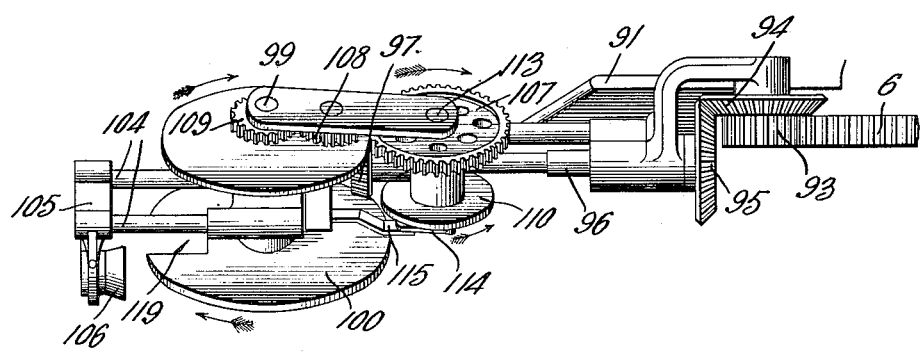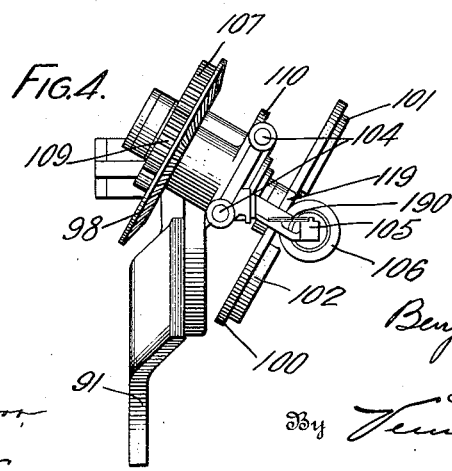

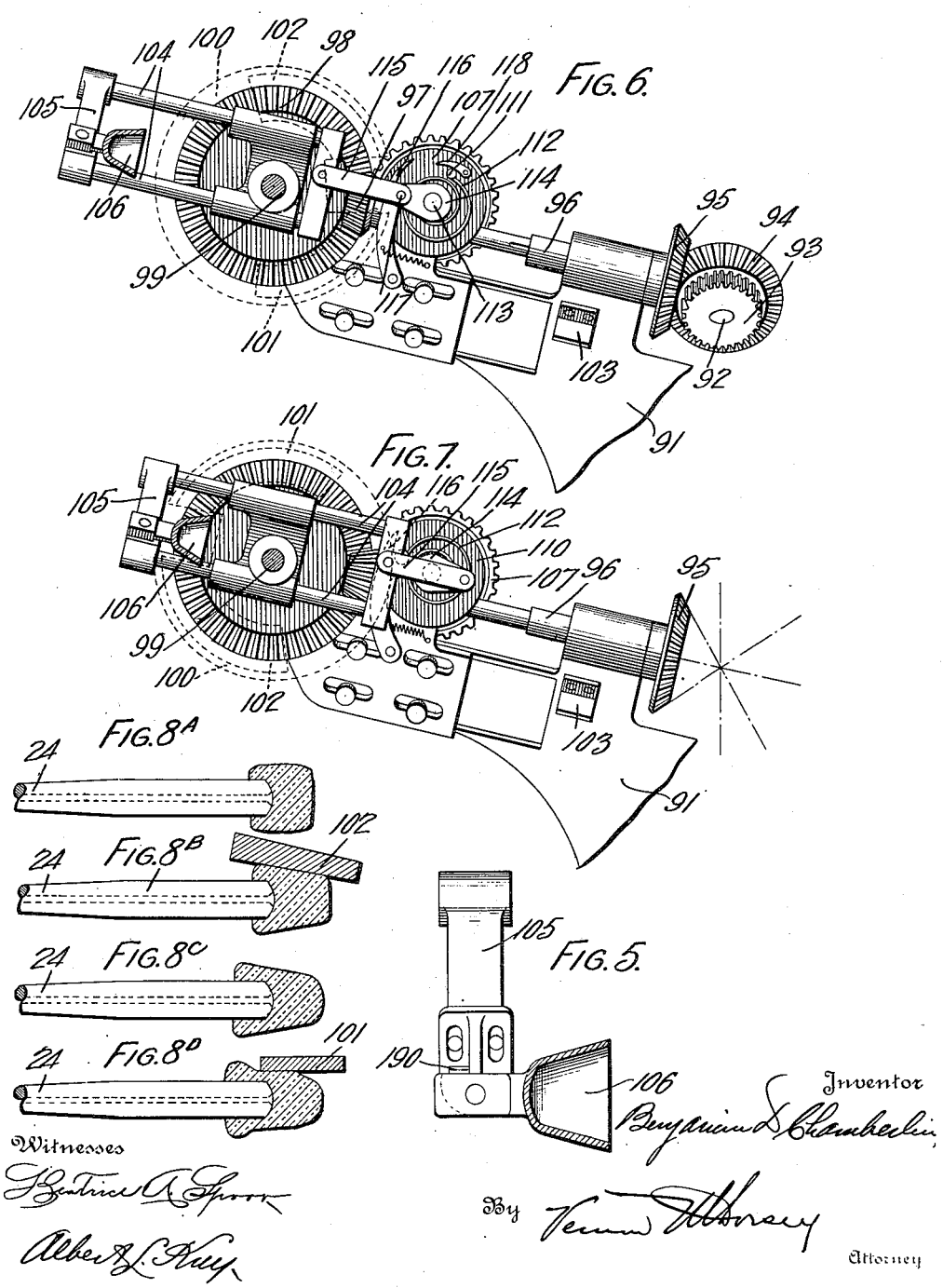

BENJAMIN D. CHAMBERLIN, OF CORNING, NEW YORK, ASSIGNOR TO EMPIRE MACHINE COMPANY, OF PORTLAND, MAINE, A CORPORATION OF MAINE.

APPARATUS FOR WORKING GLASS.

1,148,214.     Specification of Letters Patent.     Patented July 27, 1915.

Original application filed August 24, 1912, Serial No. 716,915. Divided and this application filed January 4, 1915. Serial No. 504.

*To all whom it may concern:*

Be it known that I, BENJAMIN D. CHAMBERLIN, a citizen of the United States of America, and a resident of Corning, New York, have invented certain new and useful Improvements in Apparatus for Working Glass, of which the following is a specification.

This application is a division of my prior application filed August 24, 1912, Serial Number 716,915, which was patented January 12, 1915 as Patent No. 1,124,702 for apparatus for the production of blown glass articles and the invention here sought to be patented relates to the mechanism shown in the prior application for forming glass masses into suitable blanks with a view to the subsequent blowing and molding thereof. This mechanism comprises a marverer in the shape of a disk rotating in a plane at an angle to such movement of a glass carrying spindle as positions the glass mass for marvering, the marverer having successive parts of its working face located in different planes parallel to the plane of rotation of the disk, and being positively driven in such a direction that its working surface has approximately an angular movement substantially equal to the surface of the glass mass being worked at such time.

It further comprises means whereby a blank marvered by the mechanism here described is gaged as to size and shape, and subsequently remarvered, to produce a homogeneous blank of given size preliminary to the blowing operation, and to control the distribution of glass in the finished article. This gaging of the blank is in the mechanism here shown, formed by momentary contact or inclusion of the glass in a suitable gage mold.

The invention here sought to be patented further consists of the construction, arrangement and combination of the several parts of which it is composed as will be hereinafter described and claimed.

Referring to the corresponding drawings in which corresponding parts are designated by corresponding marks of reference: Figure 1 is a front elevation of a machine embodying this invention, the parts being shown in the position they occupy during the blowing. Fig. 2 is a front elevation of the blank shaping mechanism, the parts being shown in the position they occupy immediately before cupping. Fig. 3 is a plan view thereof. Fig. 4 is an end elevation thereof. Fig. 5 is a detail view showing the gaging mold or cup and its mounting. Fig. 6 is a front elevation of the blank shaping mechanism, the marverer disk being shown dotted, and all parts being in normal position, the parts being shown as projected on a plane parallel to the plane of rotation of the marverer disk. Fig. 7 is a similar view but showing the parts in the position they assume at the instant of cupping. Figs. $8^a$, $8^b$, $8^c$, and $8^d$, represent a blank in the successive steps in its formation by a device constructed in accordance with this invention.

In the machine in association with which I have shown the subject matter of this application there is by preference a vertical webbed standard 2, arising from a trough-shaped base 1. In the standard near the top thereof is mounted a cam disk 6, having peripheral teeth, and driven intermittently from a main drive shaft 3, the construction being such that the disk will be driven through a certain angular movement, then arrested and then again put in movement to complete its full rotation, for each article produced.

A blow frame adapted to receive and hold a removable blow-pipe is mounted on the standard 2 in front of the disk 6, to oscillate in a vertical plane around an axis concentric to that of the rotation of the disk, and the disk is provided with a cam run 62 in its forward face which through suitable mechanism serves to oscillate the blow-pipe frame. The cam run 62 is so shaped that when the parts are in normal position the blow-pipe frame is substantially horizontal and that it will during the movement of the cam disk first be swung in the direction reverse to that of the movement of the disk; after a rest will then be reversed in its movement and be swung in the direction of the movement of the disk until vertical and will during further movement of the disk be temporarily held in its vertical position; and will then on further rotation of the disk be given a movement reverse to that of the rotation of the disk and returned to normal position. Some functions accomplished by these several movements of the blow-pipe frame will be hereinafter described. For the present it is sufficient to state that the initial movement of the blow-pipe frame in the direction reverse to that of the movement of the wheel raises the lower end (that is to say that end upon which is the gather of glass) of the blow-pipe slightly above the horizontal position, which is the normal position of the blow-pipe frame, and positions the blow-pipe for the marvering and cupping of the blank thereon; that the next movement of the blow-pipe, (which is in the same direction as the rotation of the disk) causes the introduction of blow-out air into the blank and places the blow-pipe in a vertical position with the blank thereon in proper relation to the mold for molding, that the temporary arrest of motion of the blow-pipe frame permits the elongation of the gather, and that the subsequent movement of the blow-pipe frame in the direction reverse to that of the rotation, of the disk restores it to its normal position. These movements and the rest at marvering and cupping are all due to the rotation of the cam disk and are functions of the rotation of that wheel.

Details of the construction and arrangement of the several parts above referred to are shown in my Patent No. 1,124,702 above referred to.

The upper end of the webbed standard 2 carries on its right hand side a projecting arm 91, on which the blank shaping device, forming the subject matter of the application, is adjustably mounted to be shifted radially in respect to the pivotal point of the blow-pipe frame, such arm being in the rear of the corresponding blow-pipe frame, the axis of the arm being at an angle above the horizontal. In the head of the web standard 2 is the stud 92, having journaled thereon a pinion 93, meshing with the peripheral teeth of the main cam disk 6, and having a beveled gear 94 fast thereto and meshing with the corresponding gear 95, upon the inner end of a telescopic jack shaft 96, carried in the upper part of the arm 91. The outer end of the telescopic shaft carries a beveled pinion 97, meshing with a beveled gear 98, on the rear end of a shaft 99 journaled in the outer end of the arm 91. The shaft 99 is transverse to the arm 91 and inclining downwardly and forwardly, and carries on its forward end in front of the arm 91 a rotary marverer disk 100, having two crown sectors 101 and 102, which are thicker at their rear than at their forward ends, the elevation of the first sector 102 being slightly greater above the plane of the marverer disk on its outside edge than that of the second sector and the inner periphery of the second sector being of greater radius than that of the first sector, and thus farther from the axis of rotation of the disk. The first sector is also beveled having its outer edge thicker than its inner, the sectors being varied in proportion and contour at their various parts to suit the glass worked and the distribution of glass which they are to accomplish. The marverer disk is thus rotated during the whole period of rotation of the main cam disk, the ratio of the gearing between them being such that the marverer disk is rotated twice to each rotation of the cam disk.

In the operation of the machine the initial rotation of the main cam disk lifts the gather end of the blow-pipe and positions the blow-pipe parallel to the axial line of the blank shaping and forming mechanism, the blow-pipe projecting past the axis of the marverer disk, and the blow-pipe frame is arrested in this raised position by a concentric portion of the cam run 62 in the main cam disk and by a stop 103, upon the forward face of the arm 91. When the blow-pipe is so positioned the marverer disk is in such position as shown in Fig. 7, that further rotation thereof will bring the thinner entering edge of the marverer sector 102 past the gather on the blow-pipe and the continuing rotation of the marvering disk causes the face of the sector 102 to pass into contact with the gather on the blow-pipe, which is in rotation due to the mechanism before described, thereby marvering the gather, and due to the shape of such face, working the glass rearwardly on the blow-pipe. A sliding frame, comprising rods 104, is mounted in the end of the arm 91 to move axially and parallel with the axis of the blow-pipe when in its raised position, the rods carrying on their outer ends a head 105, to the forwardly extending end of which is secured a gage mold or cup 106, in the axial line of the blow-pipe when raised, and normally beyond the path of movement of the gather thereon. The cup has an inwardly facing smooth internal cavity of proper size and shape, dependent upon the blank which is to be formed. Mounted at an intermediate point of the arm 91 is a shaft 113 having fast on the rear end thereof a gear wheel 107 driven through an idler 108, from a pinion 109, fast on the rear of the beveled gear 98 of the marverer disk, the said shaft 113 having fast thereon a disk 110, which has projecting from the forward face thereof a stud 111, to which one end of a volute spring 112, is secured, the opposite end of the spring being attached to a crank 114 sleeved on the front end of the shaft 113, which arm is connected by a link 115 with the sliding frame. Normally the arm 114 and link 115 are held in alinement parallel with the rods 104 by means of a dog 116, pivoted to the front of the arm 91, and engaging the pivot-pin 117 connecting the arm and link, but such dog is adapted to be released from the pivotal pin by a striker lug 118 upon the said disk contacting with a projecting nose on the dog 116. The arrangement of these parts is such that the gear 107 makes a complete revolution for each two revolutions of the marvering disk, or one revolution for each revolution of the main cam disk, and that, at the same time that a notch 119, in the periphery of the marvering disk between the rear end of the first marvering sector 102 and the front end of the second sector 101, comes opposite the gather on the lifted blow-pipe, the striking lug 118 will release the dog 116 (see Fig. 2) from the pivot pin 117 and permit the spring 112, which is at that time under tension, to rapidly rotate the arm 114 through almost a complete revolution, thus causing a sliding movement of the cupping frame formed by the rods 104, whereby the cup or gage mold will be projected upon the end of the gather and be instantly retracted therefrom. This rotary movement of the arm 114 will be arrested before the complete revolution is accomplished by the arm coming in contact with the outer end of the post 111 to which the spring is attached, and by the time such post has, by the rotation of the disk 110, been moved sufficiently far to permit the restoration of the arm to its initial position, the striking lug 118 will have moved past the nose of the dog, permitting the latter to again be positioned to engage the pivot pin 117, thereby arresting the further movement of the latter. The disk 110, continuing to revolve, will again put the spring under tension for a repetition of this action when another gather has been positioned.

In this mechanism the first cam sector 102 of the marverer is so shaped that after a mass of glass on the blow-pipe (which may have the shape as shown in Fig. 8ª) has been in contact therewith it will be given the shape of a truncated cone (see Fig. 8ᵇ) and the surplus of the gather will be worked back to a greater or less extent upon the blow-pipe and is in this shape when the gage mold 106 is projected thereon. Inasmuch as the cavity of this mold has a definite capacity and as the gage mold in every operation is moved inwardly a uniform distance and to within a fixed distance of the end of the blow-pipe, it follows that any surplus glass over the quantity predetermined by the capacity of the gage mold will be forced back upon the blow-pipe (see Fig. 8ᶜ). As that part of the gather which extends beyond the end of the blow-pipe will be distributed to form the finished article, it will be seen that each blank after the gage mold has come in contact therewith, consists of a uniform quantity of material to be utilized in the subsequent manufacture of the finished article. After the momentary shaping by the gage mold and the retraction thereof, the continued rotation of the marverer disk brings the second sector 101 thereon into contact with the blank, whereby that part of the latter which is to form the finished article is slightly elongated (see Fig. 8ᵈ) and whereby any imperfections left by the gage mold are eliminated. For the purpose of preventing injury to the machine, if for any reason the gage mold should not be retracted from in contact with the gather upon the end of the blow-pipe, the cup is pivotally mounted upon the head 105 and is normally held in position by flat springs 190, so that it may then have a limited movement with the blow-pipe and with the marverer disk until it escapes therefrom, to prevent breakage.

Suitable air mechanism for blowing the blank formed as above described is carried on the blow-pipe frame, and suitable mold mechanism 175 is mounted adjacent to the base of the web standard. Such mechanism may be of the construction and operation shown in my aforesaid Patent No. 1,124,702.

Inasmuch as this application is filed as a division of my aforesaid original application to contain claims directed to the marvering and gaging of the blank, I do not by failure to claim herein features other than those referred to, abandon the same, as such matter forms the basis of my other application No. 505, filed Jan. 4, 1915, as a division of my said original application. Moreover the claims herein made to the marvering mechanism are subordinated to claims made in my prior applications Serial Number 491,812, filed April 23, 1909; Serial Number 551,198, filed March 23, 1910; and Serial Number 737,403, filed December 18, 1912, as a division of my application Serial No. 602,532, filed January 13, 1911; nor do I in this application make any claim to the process herein shown and described as the same forms the subject-matter of my prior application Serial Number 674,814, filed February 1, 1912.

Having thus described my invention what I claim and desire to secure by Letters Patent is:

1. In a glass working machine, the combination with a glass carrying iron, of a gage mold and means for driving a solid mass of glass upon the iron, and the gage mold into momentary contact and for then separating them.

2. In a glass working machine, the combination with a glass gathering iron of a gage mold, and means for momentarily inclosing a solid gather of glass while on the iron within the gage mold.

3. In a glass working machine, the combination with a glass carrying iron, of a gage mold, means for positioning the iron in definite relation to the mold, and means for projecting the gage mold upon a solid mass of glass upon the iron and instantly removing it therefrom.

4. In a glass working machine, the combination with a glass carrying iron, of a gage mold, and means for causing a relative movement between the gage mold and the iron to cause the mold to shape a solid mass of glass on the iron by contact therewith, and means for instantly separating the glass and mold.

5. In a glass working machine, the combination with a glass carrying iron, of a gage mold, a spring for projecting the gage mold upon glass carried by the iron, a latch for holding such spring against action, and means for releasing the latch and for retracting the gage mold immediately upon the action of the spring.

6. In a glass working machine, the combination with a frame, of a slide mounted on the said frame, a gage mold carried by the slide, a glass carrying iron, means for positioning the iron in definite relation to the slide, and means for giving a definite movement to the slide in the frame to bring the gage mold in contact with the glass on the iron, and for instantly removing it therefrom.

7. In a glass working machine, the combination with a frame, of a gage mold moving relatively thereto, a glass carrying iron, means for positioning the iron in definite relation to the frame, and means for giving definite movement to the gage mold to bring it into contact with the glass on the iron and for instantly removing it therefrom.

8. In a glass working machine, the combination with a plurality of marvering plates, of a gage mold, a frame, and means for imparting relative motion between the gage mold, marvering plates and frame to successively marver a gather of glass on a blow-pipe in the frame on one of the plates, to then momentarily inclose the marvered glass in the gage mold and to then marver the gaged glass upon the other plate.

9. In a glass working machine, the combination with a frame adapted to receive a glass carrying iron, of a marvering plate inclined to the axis of the iron to press the glass thereon rearwardly, a gage mold, a marvering plate substantially parallel with the axis of the iron, and means for actuating the frame to bring the iron therein into cooperative relation with the plates and with the gage mold, and for marvering the glass upon the first plate, momentarily inclosing the marvered glass in the gage mold, and marvering the gaged blank on the second plate in the order named.

10. In a glass working machine, the combination with a marverer having a plurality of marvering faces, of means for successively bringing a gather of glass into contact with said faces and means for gaging the blank between its contact with the two faces.

11. In a glass working machine, the combination with means for supporting a gather of glass, of a marverer traveling in proximity to the gather of glass when so supported and having a plurality of marvering faces thereon inclined to the line of movement of the gather and successively brought into contact with the gather and means for gaging the gather between the contact therewith of such marvering faces.

12. In a glass working machine, the combination with a rotary marverer having inclined faces thereon, a gage mold and means actuated by the rotation of the marverer for momentarily projecting the gage mold upon the gather intermediate of the marvering action.

13. The combination with a rotating disk, having a marvering face thereon inclined to the plane of the rotation of the disk, of a gathering device and means for bringing a gather of glass on such gathering device into proximity with the plane of rotation of the disk, substantially as described.

14. In a glass working machine the combination with a marverer having a plurality of marvering faces, of means for successively bringing a gather of glass into contact with said faces.

15. In a glass blowing machine, the combination with a marverer rotating in an inclined plane, of a gathering device, and means for moving the gathering device in a vertical plane to bring a gather of glass thereon into contact with the marverer.

16. In a glass working machine the combination with a marverer rotating in a plane inclined to the vertical and having a marvering face thereon at an angle to the plane of rotation of the marverer, of means for moving a gathering device with a gather of glass thereon in a vertical plane to position the gather in the path of movement of the inclined face of the marverer.

17. In a glass working machine, the combination with a frame adapted to support a glass carrying spindle, of a marvering plate having a face inclined to the axis of the spindle, a second marvering plate substantially parallel to the axis of the spindle, and means for successively causing a marvering action by the said marvering plates on the glass carried by the said spindle.

18. In a glass-working machine, the combination with a glass-carrying iron, of a gage mold, a marverer, and means for successively presenting the iron with the glass thereon to the action of the gage mold and marverer, and holding it pendant for elongation of the glass.

19. In a glass working machine, the combination with means for supporting a gather of glass, of a gage mold, a marverer, and means for successively subjecting the glass to the action of the marverer, the gage mold, and the marverer again, and holding it pendant for elongation.

In testimony whereof I have signed my name in the presence of two witnesses.

BENJAMIN D. CHAMBERLIN.

In presence of—
DELPHINE KEAGLE,
G. WILLIS DRAKE.